Sept. 14, 1948. E. C. KRUEGER 2,449,488
WORK REST HOLDER FOR CENTERLESS GRINDERS
Filed Oct. 13, 1947 2 Sheets-Sheet 2
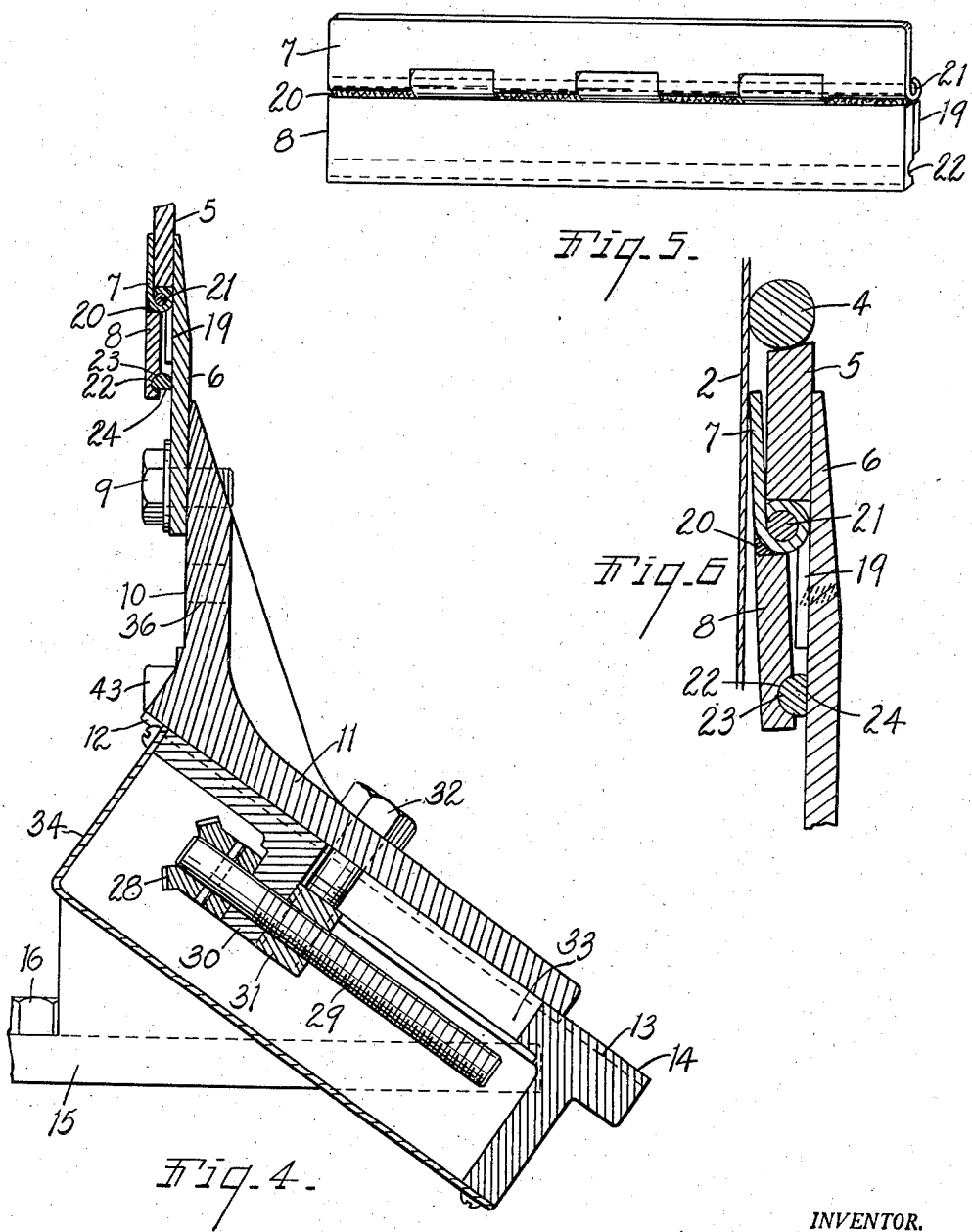
INVENTOR.
Edward C. Krueger
BY Patented Sept. 14, 1948

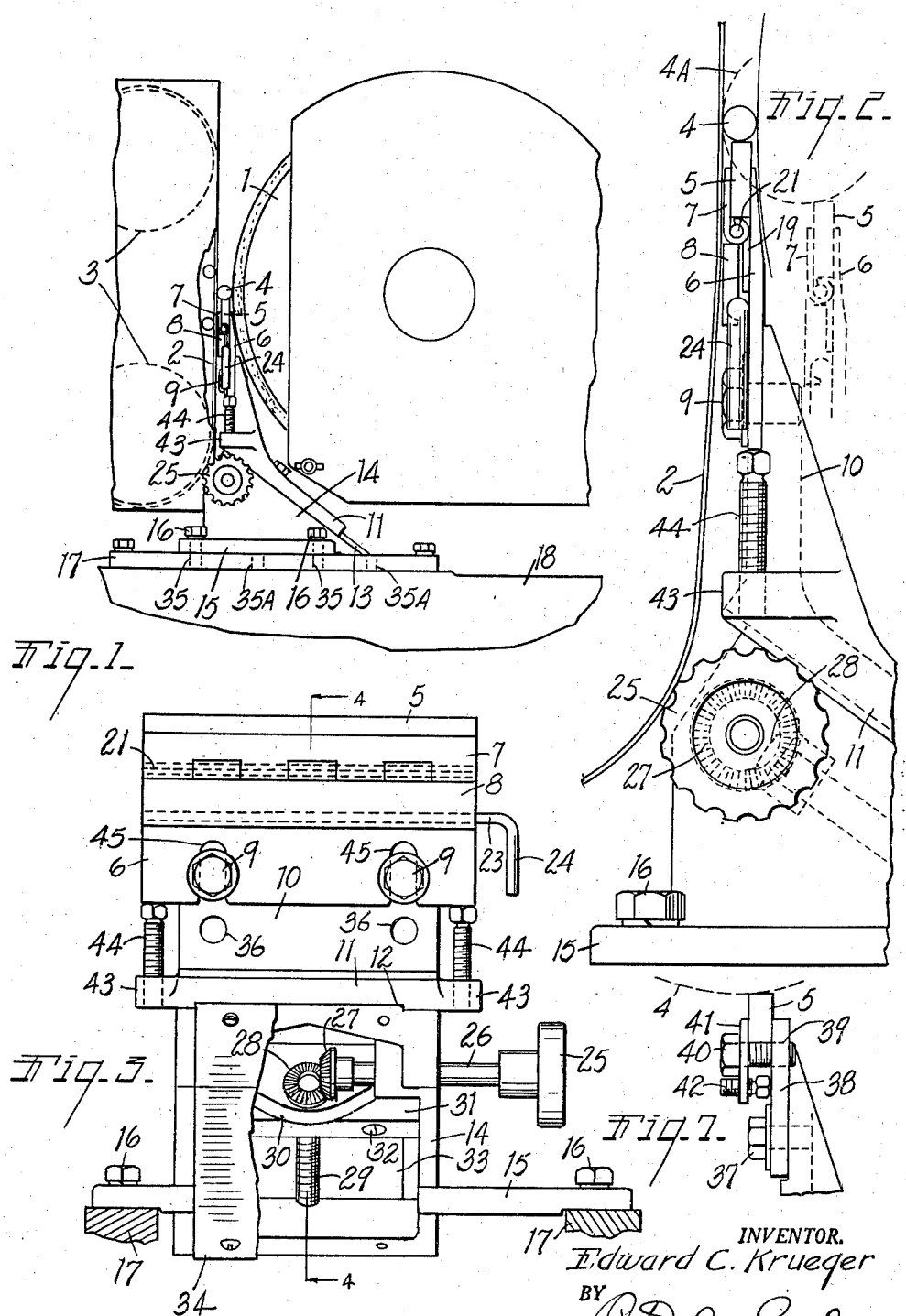

2,449,488

UNITED STATES PATENT OFFICE 2,449,488

WORK REST HOLDER FOR CENTERLESS GRINDERS

Edward C. Krueger, Otsego, Mich., assignor to Hammond Machinery Builders, Incorporated, Kalamazoo, Mich.

Application October 13, 1947, Serial No. 779,530

10 Claims. (Cl. 51—238)

This invention relates to improvements in a work rest for a centerless grinder.

The principal objects of this invention are:

First, to provide supporting mechanism for the work rest blade of a centerless grinder which is quickly and accurately adjustable for supporting a wide range of sizes of work pieces.

Second, to provide an adjustable support for the blade of a centerless grinder which is easily and quickly adjustable for receiving different types of blades.

Third, to provide a work rest for the work rest blade of a centerless grinder having a continuously variable adjustment and a second adjustment selectively variable between two positions.

Fourth, to provide a novel clamping mechanism for interchangeably holding various work rest blades on a centerless grinder which clamping mechanism occupies a minimum of space between the grinding element and feeding element of the grinder whereby work pieces of small diameter may be supported in the grinder.

Other objects relating to details and economies of the invention will appear from the description to follow. The invention is defined in the claims.

The drawings, of which there are two sheets, illustrate a preferred form of my work rest mechanism and two modified forms of clamping mechanism associated with the work rest and blade.

Fig. 1 is a fragmentary side elevational view of a centerless grinder with my work rest blade and clamp operatively associated therewith.

Fig. 2 represents an enlarged side elevational view of the work rest illustrated in Fig. 1 and indicates a range of adjustment of the work rest and blade.

Fig. 3 is a front elevational view of my work rest partially broken away to illustrate the continuous adjusting mechanism thereof.

Fig. 4 is a fragmentary vertical cross sectional view along the line 4—4 in Fig. 3.

Fig. 5 is a perspective view of the work rest blade clamp shown in Figs. 1 to 4.

Fig. 6 is an enlarged fragmentary vertical cross sectional view showing the work rest blade clamp in open position.

Fig. 7 is a fragmentary side elevational view of a modified type of clamp associated with my work rest.

As is well known in the machine tool art, a centerless grinder comprises a grinding element which may be either a grinding wheel or an abrasive belt rotating in adjustable opposed relationship to a regulating wheel or a feed belt. The work piece is supported between the grinding element and the regulating wheel or belt by the work rest so that the grinding element and regulating wheel or feed belt engage the work piece approximately at diametrically opposite sides of the work piece. In order to accommodate work pieces of different daimeter, the grinding element or the regulating wheel or the feed belt or both are adjustable toward and away from each other to receive various sized work pieces therebetween. The work rest blade must be correspondingly adjustable so as to engage the under side of the work piece slightly off center thereof and toward the grinding element, and at the same time to support the work piece at approximately the same vertical position relative to the center of the grinding element.

In the drawings, I have illustrated a grinding element consisting of a wheel 1 and a feed belt 2 rotatable around a pair of feed belt pulleys 3. The feed belt and grinding element are adjustable with respect to each other to receive various sized work pieces 4 and 4—A therebetween as is most clearly shown in Fig. 2.

The work rest blade 5 is secured to a holder plate 6 by the jaw 7 of a clamp 8 which will be more particularly described presently. The holder plate is secured by means of the screws 9 to the vertical flange 10 of a slide member 11. The slide member 11 is provided with a narrow depending rib 12 slidably mounted in slots or ways 13 on the inclined upper surface of the base 14. The base 14 is provided with laterally extending flanges 15 through which the screws 16 extend to secure the base to a pair of rails 17 mounted on the body of the grinding machine, a portion of which is illustrated at 18.

Considering now the details of the jaw and clamp which hold the work rest blade 5 on the holder plate 6, attention is invited to Figs. 4, 5 and 6. The jaw 7 consists of the upper leaf of a continuous hinge, the lower leaf 19 of which is secured as by spot welding to the front surface of the holder plate 6. The clamp 8 consists of a strip of metal which is welded as at 20 to the lower edge of the upper hinge leaf 7 so as to be rotatable therewith about the hinge pin 21. The rear surface of the clamp 8 defines a horizontally extending semi-cylindrical groove 22 which opens toward the front of the holder plate below the lower hinge leaf 19. A cam bar 23 is provided with a down turned handle section 24 (see Fig. 3) is positioned between the clamp plate 8 and holder plate 6 and engaged in the groove 22. One side of the cam bar 23 is flattened as at 24 so that when the cam bar is rotated to present the flat surface 24 to the holder plate, the clamp plate 8 and upper jaw may be swung slightly away from the holder plate to release the blade 5. A blade of different material may then be easily dropped in place and clamped by turning the flattened surface of the cam bar out of registry with the holder plate 6. As is well known, different types of work pieces will require different types of materials in the blades and my clamping mechanism is well adapted to permit rapid change of the blades.

The slide member 11 is adjustable on the base 14 by operation of a hand wheel 25 secured to the shaft 26 journaled in one side of the base. The inner end of the shaft 26 carries the beveled gear 27 meshing with the beveled gear 28 carried on the upper end of the screw shaft 29. The screw shaft 29 is journaled in the depending ear 30 formed on the under side of the base and is threadingly engaged with the adjusting block 31 secured to the under side of the slide member 11 by the screws 32. The top surface of the base 14 defines an aperture 33 through which the screws 32 extend. A stamped metal cover 34 is provided for enclosing the bevel gears 27 and 28 and the screw shaft 29.

From the above description, it is apparent that the hand wheel 25 may be rotated to cause the slide member 11 to move upwardly or downwardly along the inclined slide ways 13 of the base. Movement of the slide member will impart both vertical and longitudinal horizontal movement to the holder plate and the blade carried thereby and this movement is continuous or universal between the limits of movement of the block 31. The operator can accordingly position the work rest in any desired position relative to the grinding element and feed belt 2.

In order to provide a wider range of adjustment of the holder plate 6 and blade 5, I have provided the rails 17 with two sets of tapped apertures 35 and 35—A for receiving the screws 16 clamping the base to the rails as is most clearly shown in Fig. 1. By positioning the base over either the apertures 35 or 35—A, the positions of the work rest may be moved between a wide range of positions.

Since adjustment of the base 14 longitudinally on the rail 17 will not have a corresponding vertical adjustment of the slide member and blade, I provide the vertical flange 10 of the slide member with a second set of tapped apertures 36 arranged to receive screws 37 for clamping the modified holder plate 38 thereto. (See Fig. 7). The holder plate 38 defines the tapped apertures 39 for receiving the screws 40 to secure the alternate clamp bar 41 to the holder plate. The clamp bar 41 carries a pair of set screws 42, the heads of which are adjustable to engage the front surface of the holder plate 38 and provide pivots about which the upper edge of the clamp bar 41 swings, clamping the blade 5 to the holder plate.

Should the operator of the machine desire to grind a work piece of large diameter, he has merely to move the base 14 to the holes 35—A in the rails and to substitute the holder plate 38 for the holder plate 6 on the vertical flange of the slide member 11. The universally adjustable movement of the slide member is operative throughout its range of adjustment in either position of the base 14 so that the blades 5 may be located throughout a wide range of positions.

It will be noted that the slide member 11 is provided with forwardly projecting ears 43 at each end thereof which are tapped to receive the adjusting set screws 44, the heads of which are arranged to engage the lower edges of the holder plates 6 or 38. Each of the holder plates are provided with slotted recesses 45 for passing the shanks of the screws 40 so that the holder plates may be conveniently leveled on the slide member or positioned at any desired angle.

I have thus described a highly practical commercial embodiment of my work rest so that others may reproduce the same with such modifications as desired without further disclosure.

Having thus described my invention, what I claim as new and desire to secure by Letters Patent, is:

1. Structure for supporting a work rest blade between the grinding element and feeding element of a centerless grinder comprising a holder plate, a hinge having one leaf secured to said holder plate with the other leaf thereof acting as a jaw to clamp said blade to said plate, a clamp bar secured to said other leaf and defining a groove opposed to said holder plate, a cam rod positioned between said groove and said holder plate, said cam rod having a flattened surface adapted to permit opening of said jaw when said flattened surface is rotated into facing relationship with said holder plate, a slide member having an upstanding flange to which said holder plate is secured, said holder plate defining slots adjustably receiving bolts for securing said plate to said flange, a base having an inclined surface upon which said slide member is supported, a screw carried by said base, bevel gears for rotating said screw, a nut carried by said slide member and engaged with said screw for adjusting the position of said slide member on the inclined surface of said base member, rail members secured to said grinder and arranged to support said base in a plurality of positions along said rail members, and vertically adjustable screws carried by said slide member and engaged with the under edge of said holder plate to adjust the position of said holder plate.

2. Structure for supporting a work rest blade between the grinding element and feeding element of a centerless grinder comprising a holder plate, a hinge having one leaf secured to said holder plate with the other leaf thereof acting as a jaw to clamp said blade to said plate, a clamp bar secured to said other leaf and defining a groove opposed to said holder plate, a cam rod positioned between said groove and said holder plate, a slide member having an upstanding flange to which said holder plate is secured, said holder plate defining slots adjustably receiving bolts for securing said plate to said flange, a base having an inclined surface upon which said slide member is supported, a screw carried by said base, bevel gears for rotating said screw, a nut carried by said slide member and engaged with said screw for adjusting the position of said slide member on the inclined surface of said base member, rail members secured to said grinder and arranged to support said base in a plurality of positions along said rail members, and vertically adjustable screws carried by said slide member and engaged with said holder plate to adjust the position of said holder plate.

3. Structure for supporting a work rest blade between the grinding element and feeding element of a centerless grinder comprising a holder plate, a hinge having one leaf secured to said holder plate with the other leaf thereof acting as a jaw to clamp said blade to said plate, a clamp bar secured to said other leaf and defining a groove opposed to said holder plate, a cam rod engaged between said groove and said holder plate for clamping said other leaf against said blade, a slide member having an upstanding flange to which said holder plate is secured, a base having an inclined surface upon which said slide member is adjustably supported, and rail members secured to said grinder and arranged to support said base in a plurality of positions along said rail members.

4. Structure for supporting a work rest blade between the grinding element and feeding element of a centerless grinder comprising a holder plate, a hinge having one leaf secured to said holder plate with the other leaf acting as a jaw to clamp said blade to said plate, a clamp bar secured to said other leaf and opposed to said holder plate, a cam rod engaged between said bar and said holder plate for clamping said other leaf against said blade, a slide member having an upstanding flange to which said holder plate is secured, and a base having an inclined surface upon which said slide member is adjustably supported.

5. Structure for supporting a work rest blade between the grinding element and feeding element of a centerless grinder comprising a holder plate, a hinge having one leaf secured to said holder plate with the other leaf thereof acting as a jaw to clamp said blade to said plate, a clamp bar secured to said other leaf and having a groove therein opposed to said holder plate, a cam rod engaged between said groove and said holder plate, a slide member having an upstanding flange to which said holder plate is adjustably secured, and vertically adjustable screws carried by said slide member and engaged with the upper edge of said holder plate to adjust the position of said holder plate.

6. Structure for supporting a work rest blade between the grinding element and feeding element of a centerless grinder comprising a holder plate, a hinge having one leaf secured to said holder plate with the other leaf thereof acting as a jaw to clamp said blade to said plate, a clamp bar secured to said other leaf and having a groove therein opposed to said holder plate, a cam rod engaged between said groove and said holder plate, and a slide member having an upstanding flange to which said holder plate is adjustably secured.

7. Structure for supporting a work rest blade between the grinding element and feeding element of a centerless grinder comprising a holder plate, a hinge having one leaf secured to said holder plate with the other leaf thereof acting as a jaw to clamp said blade to said plate, a clamp bar secured to said other leaf and having a groove therein opposed to said holder plate, and a cam rod engaged between said groove and said holder plate.

8. Supporting structure for the work rest blade of a centerless grinder comprising, a base adjustably secured to said grinder, a slide member mounted for sliding adjustment on an inclined surface of said base, an upstanding flange on said slide member and defining vertically spaced pairs of apertures, a pair of holder plates adapted to be selectively secured to said flange by screws selectively engaging said apertures, a clamp including a hinge having one leaf thereof secured to one of said holder plates, and an alternate clamp secured to said other plate by screws adjustably engaging said other plate.

9. A work rest for a centerless grinder comprising a holder plate, a clamping plate disposed in opposed relationship to said holder plate along the upper portion of said holder plate and pivotally connected therewith, said clamping plate defining a horizontal groove opening to said holder plate below the pivotal connection thereof, and a cam rod disposed in said groove between said plates and adapted when rotated to move the top of said clamping plate toward said holder plate to clamp a work rest blade between said plates.

10. A work rest for a centerless grinder comprising a holder plate, a clamping plate disposed in opposed relationship to said holder plate along the upper portion of said holder plate and pivotally connected with said holder plate, and a cam rod disposed between said plates below the pivotal connection of said clamping plate and adapted when actuated to move the said clamping plate toward said holder plate to clamp a work rest blade between said plates.

EDWARD C. KRUEGER.

REFERENCES CITED

The following references are of record in the file of this patent:

UNITED STATES PATENTS

| Number | Name | Date |
|---|---|---|
| 1,421,205 | Fuller | June 27, 1922 |

FOREIGN PATENTS

| Number | Country | Date |
|---|---|---|
| 306,177 | Great Britain | Feb. 18, 1929 |
| 416,271 | Great Britain | Sept. 13, 1934 |